(12) United States Patent
Nagashima et al.

(10) Patent No.: US 6,754,611 B2
(45) Date of Patent: Jun. 22, 2004

(54) FAILURE DIAGNOSTIC SYSTEM FOR ATMOSPHERIC PRESSURE DETECTING DEVICE

(75) Inventors: Satoshi Nagashima, Okazaki (JP); Kenji Saito, Okazaki (JP); Hidetugu Kanao, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/322,738

(22) Filed: Dec. 19, 2002

(65) Prior Publication Data

US 2003/0126907 A1 Jul. 10, 2003

(30) Foreign Application Priority Data

Dec. 19, 2001 (JP) ........................................ 2001-385959

(51) Int. Cl.$^7$ ................................................ G06F 11/30
(52) U.S. Cl. ........................... 702/183; 702/47; 702/50; 702/98; 702/183; 123/479; 123/406.13; 701/114; 73/1.59; 73/118.1; 324/460; 340/611
(58) Field of Search .............................. 702/47, 50, 98, 702/138, 183, FOR 143; 123/406.13, 479; 701/114; 73/1.59, 118.1; 324/460; 340/611

(56) References Cited

U.S. PATENT DOCUMENTS

| | | | |
|---|---|---|---|
| 4,817,418 A | * | 4/1989 | Asami et al. .............. 73/118.1 |
| 6,367,316 B1 | * | 4/2002 | Eckerle et al. ................ 73/113 |
| 6,487,892 B1 | * | 12/2002 | Ito et al. ....................... 73/49.2 |
| 6,508,111 B2 | * | 1/2003 | Osaki et al. ............... 73/118.1 |
| 6,550,318 B2 | * | 4/2003 | Isobe et al. ................ 73/118.1 |

FOREIGN PATENT DOCUMENTS

JP           1-35053 A          2/1989

OTHER PUBLICATIONS

Kanaya et al., "Diagnoistic System Using a Database for High Energy Accelerator Components at the Photon Factory", Jan. 1998, KEK, pp. 1–3.*

* cited by examiner

Primary Examiner—Marc S. Hoff
Assistant Examiner—Elias Desta
(74) Attorney, Agent, or Firm—Birch, Stewart, Kolasch & Birch, LLP (57) ABSTRACT

There is provided a failure diagnostic system for an atmospheric pressure detecting device, which is capable of rationally determining whether that device has failed or not and is capable of improving the diagnostic accuracy. The failure diagnostic system is comprised of an atmospheric pressure sensor for detecting an atmospheric pressure of the air taken into an engine; a condition determination section for determining that conditions required for determining that the atmospheric pressure sensor has failed are satisfied if the number of operations, in each of which the engine continuously operates for a predetermined period of time, has exceeded a predetermined number; and a failure diagnosis section for determining that the atmospheric pressure sensor has failed if a variation in the atmospheric pressure over a period of time equivalent to that predetermined number is equal to or less than a predetermined value and the required conditions have been satisfied.

13 Claims, 6 Drawing Sheets

FAILURE DIAGNOSTIC SYSTEM FOR ATMOSPHERIC PRESSURE DETECTING DEVICE

CROSS-REFERENCE TO THE RELATED ART

This non-provisional application incorporates by reference the subject matter of Application No. 2001-385959, filed in Japan on Dec. 19, 2001, on which a priority claim is based under 35 U.S.C. §119(a).

BACKGROUND OF THE INVENTION

(1) Field of the Invention

The present invention relates to a failure diagnostic system that determines whether an atmospheric pressure detecting device for detecting an atmospheric pressure and outputting a detection signal indicative of the pressure has failed or not.

(2) Description of Related Art

Conventionally, because the atmospheric pressure has no correlation with the engine operating condition, it is difficult to check whether an atmospheric pressure sensor (atmospheric pressure detecting device) operates adequately in the case where an engine is provided with only one atmospheric pressure sensor. Accordingly, a conventional failure monitor for an atmospheric pressure sensor determines that the atmospheric pressure sensor has failed if the atmospheric pressure sensor outputs a pressure outside the range of pressures that can be detected during normal driving. In other words, if the atmospheric pressure sensor outputs an unlikely pressure outside a normal detection range as in the case of breaking or short-circuiting. This conventional failure monitor, which determines whether the atmospheric pressure sensor has failed or not according to whether the atmospheric pressure sensor outputs a pressure outside the normal detection range or not, cannot detect a failure in the atmospheric pressure sensor in the case where an output value from the atmospheric pressure sensor is stuck within the normal detection range (i.e. an output is fixed at a predetermined value) or in the case where the responsiveness of the atmospheric pressure sensor to the atmospheric pressure has deteriorated when the atmospheric pressure sensor outputs a value within the normal detection range.

As an example of conventional failure diagnostic apparatuses for atmospheric pressure sensors, there has been known a failure diagnostic apparatus disclosed in Japanese Laid-Open Patent Publication No. 01-35053. This failure diagnostic apparatus determines that an atmospheric pressure sensor has failed if a variation in the atmospheric pressure corresponding to a distance traveled is greater than a set value corresponding to the same distance traveled.

The failure diagnostic apparatus disclosed in Japanese Laid-Open Patent Publication No. 01-35053, however, has the problem that it cannot accurately detect a failure because it determines that the atmospheric pressure sensor is normal even if it has failed, in the case where an output value from the atmospheric pressure sensor is stuck within the range between the maximum pressure and the minimum pressure, which are set in correspondence with the distance traveled, or in the case where the responsiveness to the atmospheric pressure has deteriorated. Therefore, the atmospheric pressure sensor is required to be capable of quick and rational failure diagnosis as for the atmospheric pressure sensor without errors, and improved failure diagnostic accuracy.

It is therefore an object of the present invention to provide a failure diagnostic system for an atmospheric pressure detecting device, which is capable of rationally determining whether the atmospheric pressure detecting device has failed or not, and with improved diagnostic accuracy.

SUMMARY OF THE INVENTION

To attain the above object, there is provided a failure diagnostic system for an atmospheric pressure detecting device which counts the number of operations of the device to be operated whose operating condition is controlled using an atmospheric pressure detected by the atmospheric pressure detecting device, stores information related to the detected atmospheric pressure, and determines that the atmospheric pressure detecting device has failed if a variation in the atmospheric pressure calculated based on atmospheric pressure related information stored before the number of operations reaches a predetermined number of times is equal to or less than a predetermined value.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE INVENTION

A description will now be given of a preferred embodiment of a failure diagnostic system for an atmospheric pressure detecting device according to the present invention with reference to the drawings.

Figure 1:
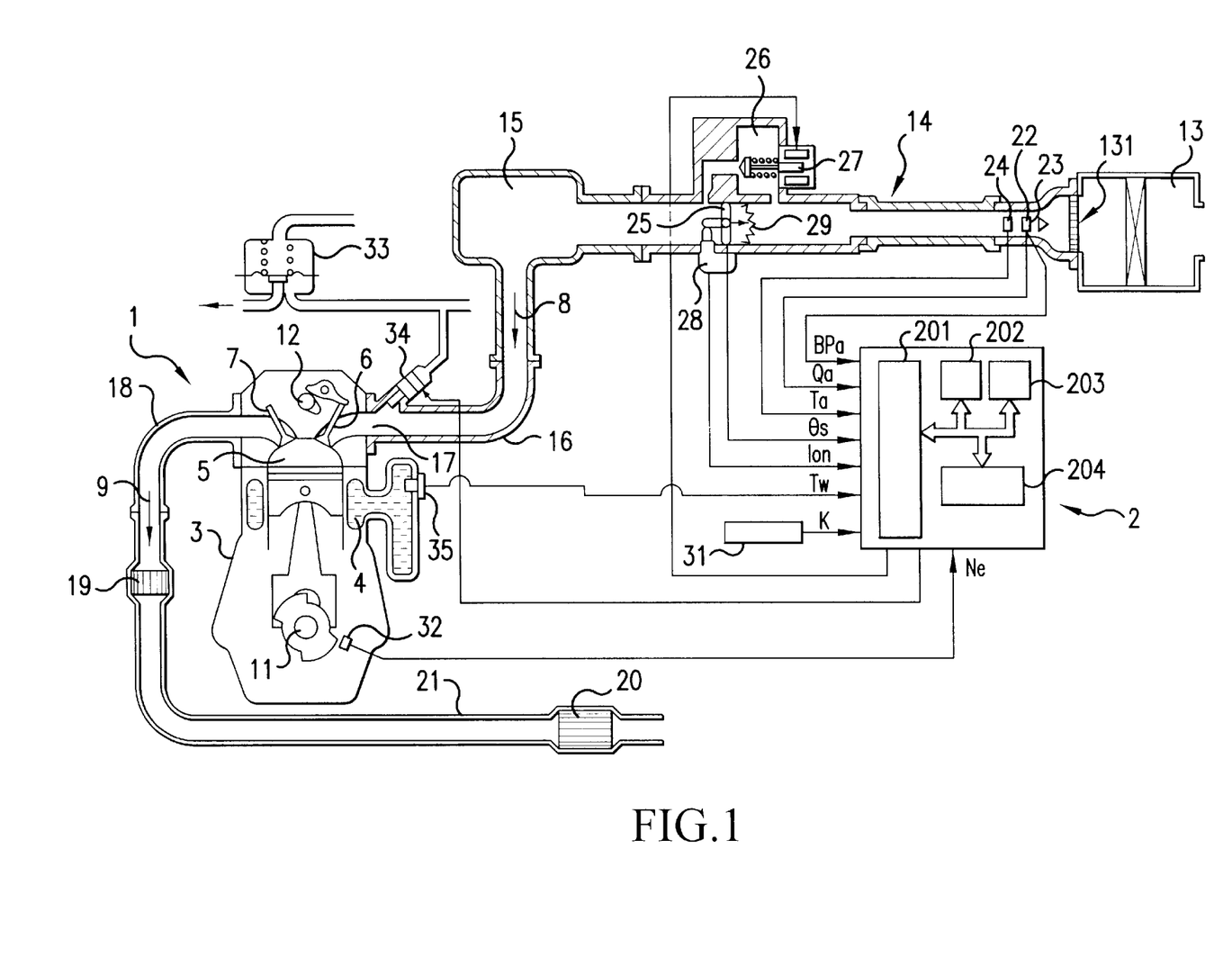
FIG. 1 is a schematic diagram showing the construction of an engine of a vehicle to which is applied a failure diagnostic system for an atmospheric pressure detecting device according to an embodiment of the present invention.

A failure diagnostic system for an atmospheric detecting device according to a first embodiment of the present invention is annexed to an engine controller 2 serving as a control device for an engine 1 of a vehicle, not shown. The engine controller 2 constitutes a control function section of the failure diagnostic system for the atmospheric detecting device.

The engine 1 is a multiple cylinder engine, and a plurality of cylinders is serially disposed in a body 3 of the engine 1.

A water jacket 4 of a cooling system is formed around the plurality of cylinders.

A combustion chamber 5 for the cylinders is capable of communicating with an intake passage 8 via an intake valve 6, and is capable of communicating with the intake passage 8 and an exhaust passage 9 via an exhaust valve 7. The intake valve 6 and the exhaust valve 7 are actuated by a valve driving system, not shown, having an intake cam shaft 12 moving in response to the movement of an engine crank shaft 11.

The intake passage 8 is comprised of an air cleaner 13, an intake pipe 14, a surge tank 15, an intake manifold 16, and an intake port 17. The air absorbed through the air cleaner 13 flows in the intake passage 8 via the intake pipe 14, the surge tank 15, the intake manifold 16, and the intake port 17 in this order, and flows into the combustion chamber 5 when the intake valve 6 is opened.

The exhaust passage 9 is comprised of an exhaust port, an exhaust manifold 18, and an exhaust pipe 21. The exhaust gas, which is exhausted from the combustion chamber 5 when the exhaust valve 7 is opened, flows in the exhaust passage 9 via the exhaust port, the exhaust manifold 18, and the exhaust pipe 21 in this order, and is emitted into the atmosphere through a muffler, not shown. The exhaust pipe 21 is provided with an upstream catalyst 19, which has a relatively small capacity and is capable of activating quickly, and a downstream catalyst 20, which has a relatively large capacity and is capable of purifying the exhaust gas with an excellent durability.

In the intake passage 8, an atmospheric pressure sensor 23 serving as the atmospheric pressure detecting device that detects an atmospheric pressure BP and an air flow sensor 22 that detects an intake air volume Qa are closely disposed in the vicinity of an outlet port 131 of the air cleaner 13. An intake air temperature sensor 24 that detects and outputs an intake air temperature Ta is disposed downstream of and in the vicinity of the atmospheric pressure sensor 23 and the air flow sensor 22. The atmospheric pressure BP, intake air volume Qa, and intake air temperature Ta detected by those respective sensors are outputted to the engine controller 2.

A throttle valve 25, a bypass 26 that bypasses the throttle valve 25, and a an idle speed control valve 27 that opens and closes the bypass 26 are arranged between the air cleaner 13 and the surge tank 15 in the intake passage 8. An idle switch 28, which detects the fully closed state of the throttle valve 25, and a throttle sensor 29, which detects an angle θs of the throttle valve 25, are disposed in the vicinity of the throttle valve 25. The values Ion and Ts, respectively, obtained by the idle switch 28 and the throttle sensor 29 are also outputted to the engine controller 2. In addition, a key-on signal K is outputted from a key sensor 31 to the engine controller 2 when an engine key is turned on, and an engine speed signal Ne is outputted from a crank angle sensor 32 to the engine controller 2 when the engine 1 is rotated.

A fuel injection valve 34, which injects fuel into the intake port 17, is provided in the vicinity of a downstream end of the intake manifold 16. The fuel injection valve 34 is supplied with fuel that has been pressure-regulated by a regulating device 33 disposed in a fuel supply passage, and injects the pressurized fuel in response to an injection signal outputted from the engine controller 2.

An engine water temperature sensor 35, which detects the temperature of cooling water in the water jacket 4 and outputs a signal indicative of the water temperature Tw, is attached to the body 3, and the signal indicative of the water temperature Tw is outputted to the engine controller 2.

The engine controller 2 is comprised of an input/output interface 201, a storage section 202, a nonvolatile memory 203 for battery backup, and a central processing section 204. The engine controller 2 has a function of providing fuel control, ignition timing control, and intake air quantity control for the engine 1, and a function of determining whether the atmospheric pressure sensor 23 has failed or not.

The atmospheric pressure BP is used in calculating an air-fuel ratio correction value during the fuel control and an ignition timing correction value during the ignition timing control. Particularly, in the case where the atmospheric pressure BP detected by the atmospheric pressure sensor 23 lies in a low-pressure range equal to or less than a high-altitude atmospheric pressure BPα as a threshold, e.g. 570 mmHg (refer to FIG. 2), failure diagnostic monitors for an air-to-fuel ratio sensor and the like, not shown, are stopped. Thus, in the case where an output from the atmospheric pressure sensor 23 is stuck in the range of pressures equal to or less than the high-altitude atmospheric pressure BPα, the atmospheric pressure sensor 23 is highly required to quickly perform failure diagnosis because the failure diagnostic monitors for the air-to-fuel ratio sensor and the like are stopped.

Figure 3A:
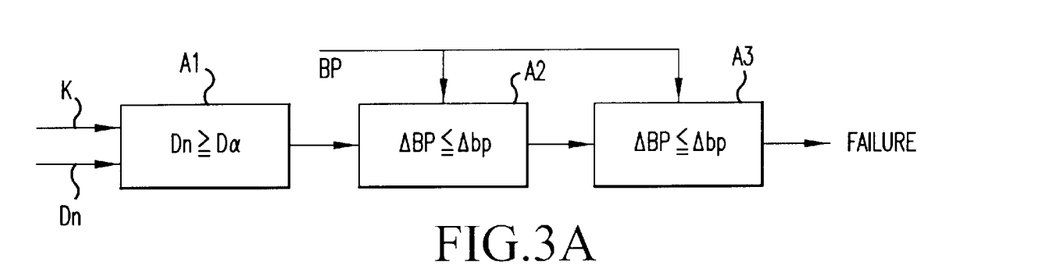
FIGS. 3A and 3B are block diagrams showing the control arrangement of the failure diagnostic system in FIG. 1, wherein FIG. 3($a$) shows a first embodiment and FIG. 3($b$) shows a second embodiment.

Incidentally, referring to FIG. 3(*a*), the engine controller 2 is comprised of a condition determination section A1 and a failure diagnosis section A2 that constitute a failure diagnostic function section of the atmospheric pressure sensor 23, and a determination means A3 that determines whether or not the atmospheric pressure BP is equal to or less than the high-altitude atmospheric pressure BPα.

The condition determination section A1 determines that conditions of failure diagnosis for the atmospheric pressure sensor 23 have been satisfied, if the counted number of operations Dn, in each of which the engine 1 continuously operates for a predetermined period of time after the key-on start (i.e. the input of the key-on signal K from the key switch 32), becomes equal to or greater than a predetermined number of times Dα (Dn≧Dα).

Specifically, one warm-up cycle (W/U) is assumed to be one operation Dn. In one warm-up cycle (W/U), as shown in FIG. 4, the engine 1 is started in response to the key-on signal K, the engine water temperature Tw increases as the warm-up of the engine 1 proceeds, and upon completion of the warm-up, an engine cooling apparatus, not shown, is operated to inhibit an excessive increase in the water temperature while the vehicle continues running, and the engine 1 is then stopped at a suitable time (indicated by "e" in FIG. 4) to lower the water temperature Tw.

For example, in response to the detection of the start of the engine 1 via the key-on signal K, and the detection that the water temperature Tw outputted from the water temperature sensor 35 as the temperature detecting device has increased by a predetermined value Tα or greater from a water temperature Tws detected at the start of the engine 1 and has exceeded a predetermined warm-up completion temperature Tw0 (e.g. 72θC.), it is estimated that the operation of one warm-up cycle (W/U) is to be realized, and the number of operations Dn is incremented by one.

Figure 4:
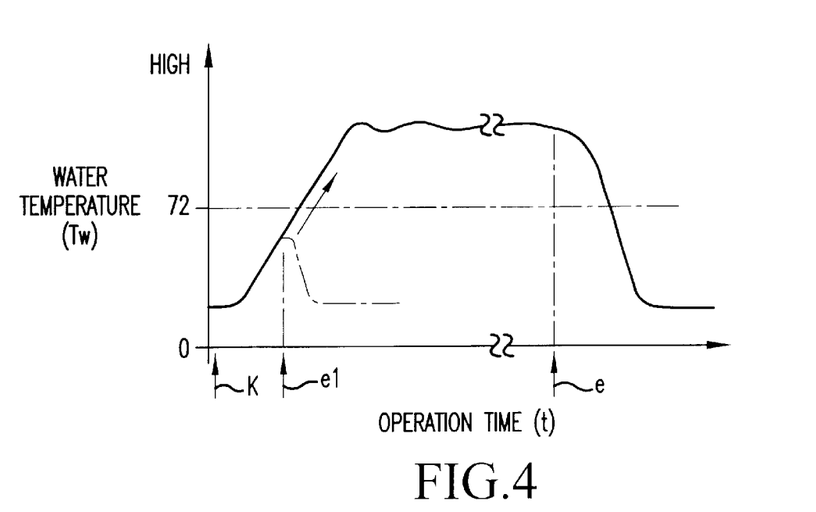
FIG. 4 is a view showing a characteristic diagram showing a variation in the engine water temperature of the vehicle shown in FIG. 1.

It should be noted that the number of operations Dn is never counted in such a short-cycle operation that the engine 1 is stopped before the water temperature Tw exceeds the warm-up completion temperature Tw (time point e1) or before the water temperature Tw increases by a predetermined value or greater from the water temperature Tws detected at the start of the engine 1 as indicated by an alternate long and short dash line in FIG. 4. This is intended to check an output from the atmospheric pressure sensor 23 only in the case where the vehicle is running for a sufficient period of time, and prevent the number of short-cycle operations from being counted. Therefore, it is possible to prevent the number of operations from being counted in the case where the vehicle runs for such a short period of time that an output from the atmospheric pressure sensor 23 hardly varies.

Alternatively, in response to the detection that the water temperature Tw outputted from the water temperature sensor 35 has exceeded the predetermined temperature Tw0 (e.g. 72° C.), the number of operations Dn may be incremented by one based on the estimation that the operation of one warm-up cycle (W/U) is to be realized.

In the present embodiment, only the water temperature sensor 35 is used to detect that the engine temperature (the water temperature Tw) has increased by the predetermined value Tα or greater from the engine temperature detected at the start of the engine 1 (i.e. the water temperature Tws) and has exceeded the warm-up completion temperature Tw0 (e.g. 72° C.). Based upon this detection, it is estimated that the engine 1 operates for a predetermined period of time after the key-on start and the operation of one warm-up cycle (W/C.) is to be realized. Therefore, whether the engine 1 will continuously operate in one warm-up cycle (W/U) or not can be determined without using any other special sensors.

The above-mentioned predetermined number of times Dα is determined to be equivalent to such a failure determination time that the output from the atmospheric pressure sensor 23 does not vary for a predetermined period of time and is considered to be stuck. In this example, the predetermined number of times Dα is set to 15, and when the number of operations Dn reaches 15, it can be estimated that about one week has elapsed. If the predetermined number of times Dα is too small, it is easily affected by disturbance included in the output from the atmospheric pressure sensor 23, and if the predetermined number of times Dα is too large, failure diagnosis is delayed. Therefore, the predetermined number of times Dα is increased or decreased properly in order to increase the failure diagnostic reliability.

When it is determined that the number of operations Dn as the condition required for diagnosis failure by the condition determination section A1 has reached the predetermined number of times Dα, the failure diagnosis section A2 determines that the atmospheric pressure sensor 23 has failed, if a variation ΔBP (absolute value) in the detected atmospheric pressure BP (hereinafter only referred to the "atmospheric pressure BP") before the number of operations Dn reaches the predetermined number of times Dα is equal to or less than a predetermined value Δbp (ΔBP≦Δbp), see FIG. 3(a).

The variation ΔBP in the atmospheric pressure BP is calculated as a difference between the maximum atmospheric pressure BPMAX and the minimum atmospheric pressure BPMIN (ΔBP=|BPMAX−BPMIN|) within a period of time before the number of operations Dn reaches the predetermined number of times Dα. In this example, the predetermined value Δbp as a threshold is set to 3 mmHg on the assumption that the vehicle runs in the same area for about one week and there is usually a variation of at least 5 to 6 mmHg in the atmospheric pressure. The predetermined value Δbp, however, may be increased or decreased according to the area where the vehicle runs. If the variation ΔBP in the atmospheric pressure BP detected by the atmospheric pressure sensor 23 within the predetermined period of time before the number of operations Dn reaches the predetermined number of times Dα is equal to or less than the predetermined value Δbp, the failure determination means A2 determines that the atmospheric pressure sensor 23 has failed.

The determination section A3 determines whether or not the atmospheric pressure BP detected by the atmospheric pressure 23 (the atmospheric pressure detecting device) is equal to or less than the predetermined high-altitude atmospheric pressure BPα. The high-altitude atmospheric pressure BPα is set to 570 mmHg (refer to FIG. 2), taking the following points into account.

In the case where the high-altitude atmospheric pressure BPα is set to 570 mmHg and there is a condition that failure diagnosis is carried out when the atmospheric pressure BP is equal to or less than the high-altitude atmospheric pressure BPα, it is impossible to determine whether the atmospheric pressure sensor 23 has failed or not if the atmospheric pressure sensor 23 fails while outputting an atmospheric pressure greater than 570 mmHg. For this reason, if the atmospheric pressure sensor 23 fails while outputting a value greater than the high-altitude atmospheric pressure BPα (570 mmHg) in the case where the conditions of failure diagnosis by failure diagnostic monitors for an air-to-fuel ratio sensor used for air-to-fuel ratio correction in the fuel control and the like include a condition that an output from the air-to-fuel ratio sensor and the like is monitored while the atmospheric pressure sensor outputs an atmospheric pressure of not less than 570 mmHg, the failure in the atmospheric sensor 23 does not affect the failure diagnostic monitors for other sensors. Namely, it is possible to prevent needless enlargement of such an operational range that failure diagnosis by monitors used for other control is prohibited due to a failure in the atmospheric pressure sensor 23 before the atmospheric pressure sensor 23 is restored.

For the reasons stated above, in the present embodiment, whether the atmospheric pressure sensor 23 has failed or not is determined only if it is determined that the atmospheric pressure BP detected by the atmospheric pressure sensor 23 is equal to or less than the high-altitude atmospheric pressure BPα.

In the present embodiment, whether the atmospheric pressure sensor 23 has failed or not is determined only when an output from the atmospheric pressure BP detected by the atmospheric pressure sensor 23 is stuck in the range of pressures equal to or less than the high-altitude atmospheric pressure BPα. Therefore, once the atmospheric pressure has failed, it is possible to easily determine that the atmospheric pressure sensor 23 has failed while outputting an atmospheric pressure equal to or less than 570 mmHg and to quickly take proper measures to restore the atmospheric pressure sensor 23. Incidentally, the high-altitude atmospheric pressure BPα is not limited to 570 mmHg, but it may be corrected appropriately. Note that a description will be given later of an embodiment that eliminates the use of the determination section A3 for determining whether or not the atmospheric pressure BP is equal to or less than the high-altitude atmospheric pressure BPα.

As described above, according to the present embodiment, the condition determination section A1, the failure diagnosis section A2, and the determination section A3 determine that the atmospheric pressure sensor 23 has failed if the variation ΔBP in the atmospheric pressure BP within a predetermined period of time before the number of operations Dn reaches the predetermined number of times Dα is equal to or less than the predetermined value Δbp in the case where the atmospheric pressure BP detected by the atmospheric pressure sensor 23 is equal to or less than the high-altitude atmospheric pressure BPα and the number of operations Dn has reached the predetermined number of times Dα.

Figure 2:
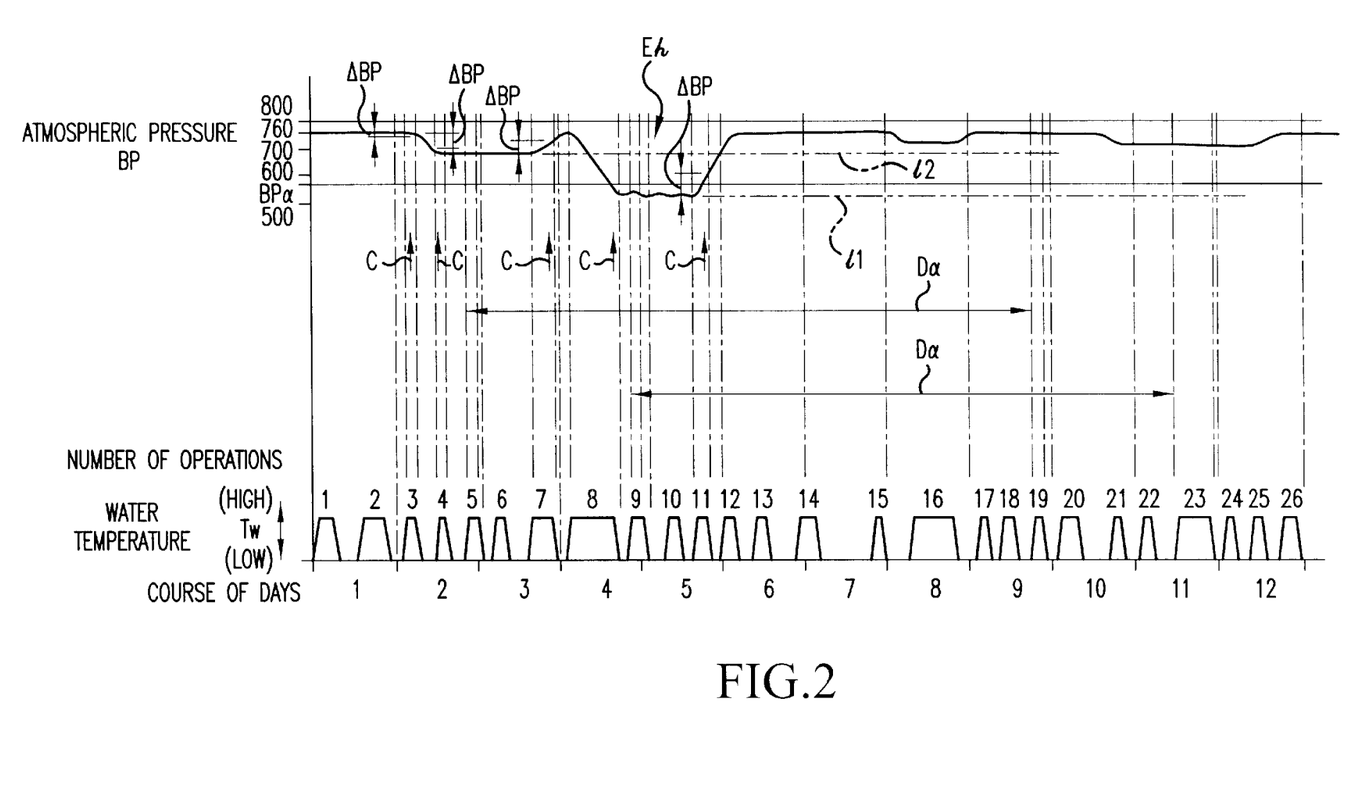
FIG. 2 is a waveform chart showing the relation between the atmospheric pressure in an area where the vehicle shown in FIG. 1 has run and the elapsed time.
Figure 5:
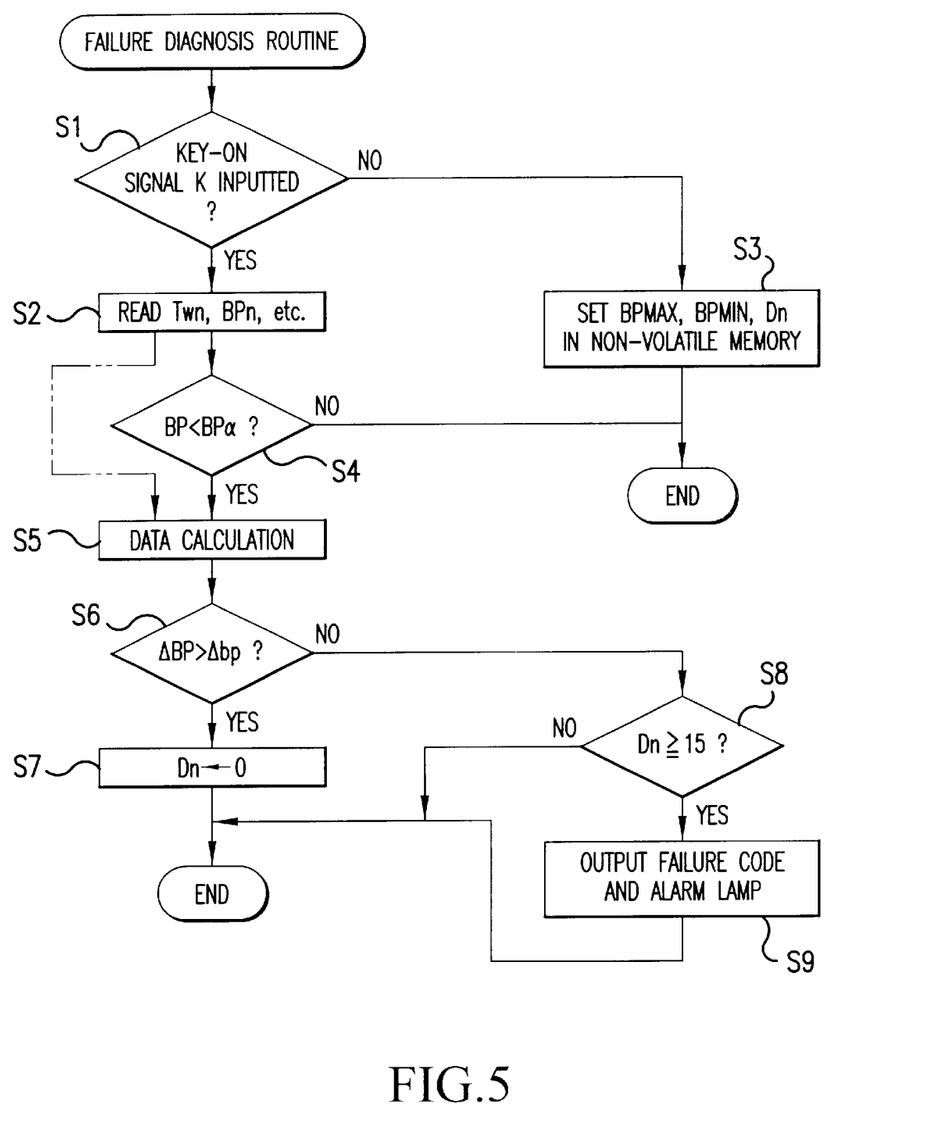
FIG. 5 is a flow chart showing a failure diagnosis routine executed by an engine controller of the failure diagnostic system shown in FIG. 1.
Figure 6:
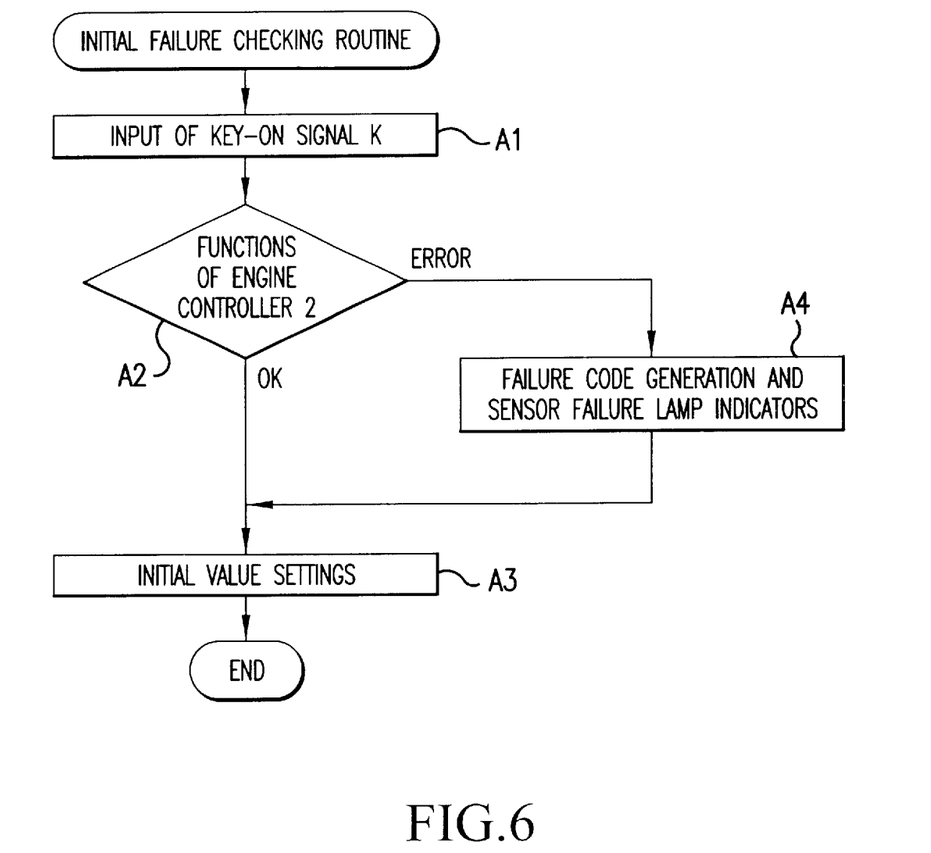
FIG. 6 is a flow chart showing an initial failure checking routine executed by the engine controller of the failure diagnostic system shown in FIG. 1.
Figure 7:
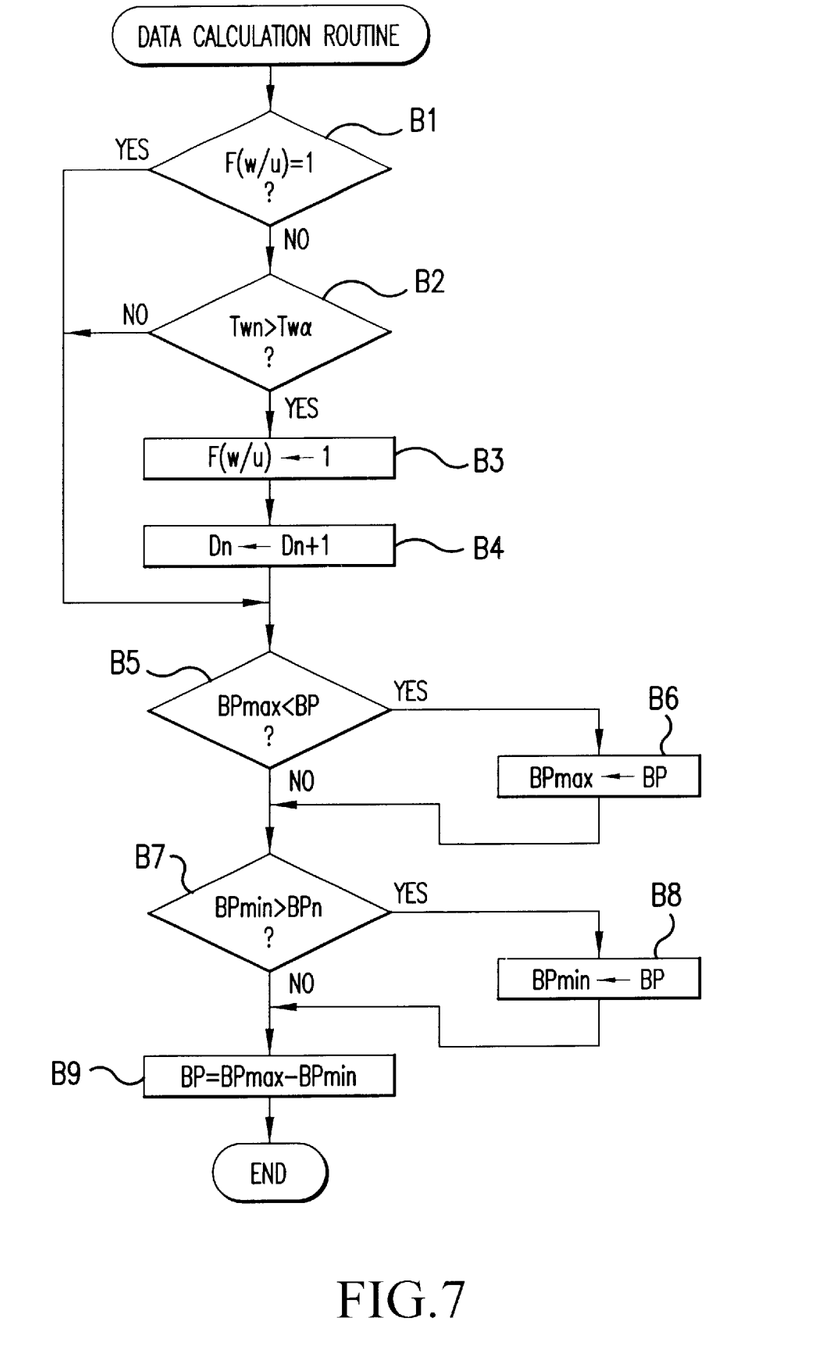
FIG. 7 is a flow chart showing a data calculating routine executed by the engine controller of the failure diagnostic system shown in FIG. 1.

A description will now be given of an atmospheric pressure detecting device failure diagnosing process carried out by the engine controller 2 with reference to a waveform chart of FIG. 2 showing the relation between the atmospheric pressure and the elapsed time and FIGS. 5, 6 and 7 showing a failure diagnosis routine, an initial check routine, and a data calculation routine, respectively.

Generally, the vehicle runs repeatedly in the same area, and in fine weather, the atmospheric pressure in the same area varies around 760 mmHg according to climatic changes. Moreover, if the vehicle goes a long way to a high-altitude place (indicated by "Eh" in FIG. 2), the atmospheric pressure can be estimated to vary within the low-pressure range as shown in FIG. 2.

It can be assumed that the vehicle repeats engine operation of one warm-up cycle (W/U), in which the vehicle continues running a predetermined distance after completion of warm-up following the cold start of the engine, twice or three times per day. FIG. 2 is a schematic diagram showing a variation in the water temperature Tw over the course of days.

While the vehicle is running, the engine controller 2 carries out initial check in a main routine, not shown, in response to the engine key-on signal K. In the initial check, for example, as shown in FIG. 6, the input of the key-on signal K is ascertained in Step a1, and it is self-determined in Step a2 whether devices related to a plurality of functions of the engine controller 2 such as intake control function, fuel control function, ignition control function, and the like are normal or not. If the determination is positive (OK), the process proceeds to Step a3, and if the determination is negative (Error), the process proceeds to Step a4. In the Step a4, a code related to the abnormal control function is outputted and a failure lamp of each failure sensor, e.g. the atmospheric pressure sensor 23 is turned on, and the process then proceeds to the Step a3. It should be noted that a diagnosis connector, not shown, is connected to an output terminal of the engine controller 2, and a known multiuse tester is connected to the diagnosis connector at a suitable time. Displaying the failure code on the multiuse tester enables detection of a failure in the atmospheric pressure sensor 23 or the like, and makes it possible to quickly take measures to restore the atmospheric pressure sensor 23 or the like.

In the Step a3, the values detected by sensors related to the intake control, fuel control, ignition control, and the like, i.e. the atmospheric pressure BP detected by the atmospheric pressure sensor 23, the intake air volume Qa detected by the air flow sensor 22, the intake air temperature Ta detected by the intake air temperature sensor 24, the angle θs of the throttle valve 25, the turning-on Ion of the idle switch 28, the water temperature Tw detected by the water temperature sensor 35, the key-on signal K from the key sensor 31, the engine speed signal Ne from the crank angle sensor 32, and so forth are read as respective initial values, and a variety of flags are initialized. In particular, a warm-up flag F(w/u) is cleared, and the maximum atmospheric pressure BPMAX and the minimum atmospheric pressure BPMIN in operations so far and the number of operations up to the present, which has not yet been cleared, are read from the nonvolatile memory 203, and the process returns to the main routine, not shown.

In the middle of the main routine, not shown, the engine controller 2 provides intake control, fuel control, and ignition timing control sequentially in order to properly drive the engine 1 based on the data acquired from the sensors, causing the vehicle to continue running. The process then proceeds to the failure diagnosis routine shown in FIG. 5.

In the failure diagnosis routine, it is ascertained in Step s1 whether the key-on signal K has been inputted or not. If the determination result is positive (Yes), the process proceeds to Step s2, and if the determination result is negative (No), the process proceeds to Step s3. In the Step s2, the newest water temperature Twn, atmospheric pressure BPn, and so forth are read, and the process then proceeds to Step s4.

In the Step s4, it is determined whether or not the present atmospheric pressure BP is equal to or smaller than the high-altitude atmospheric pressure BPα. Namely, the function of the determination section A3 is realized in the Step s4. If the determination result is positive (Yes) in the Step s4, the process proceeds to Step s5, and if the determination result is negative (No), the present control is terminated and the process returns to the main routine.

It should be noted that as shown in FIG. 2, from the first to the third day, the vehicle repeats running on flatlands seven times (i.e. the number of operations Dn is 7), and in any case, if it is determined in the Step s4 that the present atmospheric pressure BP is greater than the high-altitude atmospheric pressure BPα (570 mmHg), the control is terminated and the process returns to the main routine.

As shown in FIG. 2, when the vehicle runs on highlands (indicated by "Eh" in FIG. 2) on the fourth and fifth days and the process proceeds to the Step s5 due to the determination in the Step S4 that the present atmospheric pressure BP is equal to or less than the high-altitude atmospheric pressure BPα (570 mmHg), i.e. the vehicle is running on highlands, the data calculation routine shown in FIG. 7 is executed and the process then proceeds to Step s6.

In Step b1 in the data calculation routine, it is determined whether the warm-up flag F(w/u) is 1 or not. At the initial stage of cold-start, the determination result is negative (No), and the process proceeds to Step b2. As the warm-up has progresses, the process proceeds to Step b5.

In the Step b2, it is determined whether the water temperature Tw has exceeded a warm-up determination value Twα (72θC.) or not before the warm-up. If the determination result is negative (No), the process proceeds to the Step b5, and if the determination result is positive (Yes), the process proceeds to Step b3. In the Step b3, the warm-up further progresses, and it is assumed that the operation of one warm-up cycle (W/U) shown in FIG. 4 is to be realized, and the warm-up flag F(w/u) is set to 1. In the next Step b4, the number of operations Dn up to the present is updated by adding 1. The process then proceeds to the Step b5.

In the step b5, it is determined whether the newest atmospheric pressure BP is greater than the maximum atmospheric pressure BPMAX or not. If the determination result is positive, the process proceeds to the Step b6 wherein the maximum atmospheric pressure BPMAX is updated to the newest atmospheric pressure BP and the process then proceeds to Step b7. In the Step b7, it is determined whether the newest atmospheric pressure BPn is less than the minimum atmospheric pressure BPMIN or not. If the determination result is positive, the process proceeds to Step b8, and if the determination result is negative, the minimum atmospheric pressure BPMIN is updated to the newest atmospheric pressure BP and the process then proceeds to Step b9.

In the Step b9, a difference between the maximum atmospheric pressure BPMAX and the minimum atmospheric pressure BPMIN is calculated as a variation ΔBP that is an absolute value (ΔBP=|BPMAX−BPMIN|). The process then proceeds to the Step S6 of the failure diagnosis routine (FIG. 5).

In the Step s6, it is determined whether the variation ΔBP is greater than the predetermined value Δbp or not. If the determination result is positive, the process proceeds to Step s7, and if the determination result is negative, the process proceeds to Step s8.

The process proceeds to the Step s7 provided that it has been ascertained that the atmospheric pressure sensor 23 is normally operating with its output values being varied, e.g. the variation ΔBP as the difference between the maximum atmospheric pressure BPMAX and the minimum atmospheric pressure BPMIN in the eighth operation on the fourth day onward in FIG. 2 is greater than the predetermined value Δbp. Whenever the variation ΔBP is greater than the predetermined value Δbp, the process proceeds from the Step s6 to the Step s7 wherein the present number of operations Dn is cleared so as to clear the present failure diagnosis, and the process then returns to the main routine. Note that in FIG. 2, the clearing process is indicated by an arrow designated by "C".

For example, in the case where the variation ΔBP is equal to or less than the predetermined value Δbp for the reason that the atmospheric pressure sensor 23 does not operate or for other reasons, the process proceeds from the Step s6 to Step s8. For example, it is assumed that the atmospheric pressure sensor 23 continuously outputs the atmospheric pressure BP indicated by a two-dot chain line 11 from the ninth operation on the fourth and fifth days onward in FIG. 2. In this case, the variation ΔBP as the difference between the maximum atmospheric pressure BPMAX and the minimum atmospheric pressure BPMIN approximates to zero, and is less than the predetermined value Δbp.

If the process proceeds to the Step s8 in this state, the present number of operations Dn is called up, and it is determined whether the present number of operations Dn has reached the predetermined number of times Dα (=15 times) equivalent to the predetermined period of time (=about one week). If the present number of operations Dn has not yet reached the predetermined number of times Dα, the present control is terminated and the process returns to the failure diagnosis routine via the main routine so as to execute the Step s1 to the Step s6 or s8 again. If it is determined that the engine key has been turned off according to the signal K from the key switch 32, the process proceeds to the Step s3 wherein the present number of operations Dn, the maximum atmospheric pressure BPMAX, and the minimum atmospheric pressure BPMIN are set in the nonvolatile memory 203 to back up a battery. The control is then terminated to finish the operation of the present warm-up cycle (W/U).

Further, the engine 1 is cold-started in response to the next turning-on of the engine key and the process proceeds to the Step a3 of the initial check routine (FIG. 6). In the Step a3, the maximum atmospheric pressure BPMAX, the minimum atmospheric pressure BPMIN, and the number of operations Dn up to the present are read from the nonvolatile memory 203. The process then proceeds to the failure diagnosis routine via the main routine, and proceeds to the Step b4 of the data calculating process in the Step s5. In the Step b4, the number of operations Dn is incremented by one. In this way, the number of operations Dn is incremented by one every time the operation of one warm-up cycle (W/U) is finished.

For example, it is assumed that the atmospheric pressure sensor 23 continuously outputs the atmospheric pressure BP indicated by a two-dot chain line 11 in FIG. 2 from the ninth operation on the fourth day onward in FIG. 2, and the number of operations Dn is incremented sequentially. In this case, in the twenty-third operation on the eleventh day, it is determined that the number of operations Dn has reached the predetermined number of times Dα, and at this time point, the process proceeds from the Step s8 to Step s9. In this way, if the number of operations Dn has reached the predetermined number of times Dα, it can be assumed that an output from the atmospheric pressure sensor 23 is stuck (i.e. the output is fixed at a predetermined value) because the variation ΔBP in the atmospheric pressure BP detected by the atmospheric pressure sensor 23 in a period of time before the number of operations Dn reaches the predetermined number of times Dα is less than the predetermined value Δbp. In this case, a failure code is outputted and is set in the nonvolatile memory 203, and an alarm, lamp, not shown, is turned on in the Step s9. The present control is then terminated, and the process returns to the main routine. It should be noted that the failure code set in the nonvolatile memory 203 can be displayed repeatedly on the failure lamp if the process proceeds from the Step a2 to the Step a4 in the initial check routine executed again, and the failure code is displayed by the known multiuse tester connected to the engine controller 2 via the diagnosis connector, not shown, so that a place of failure can be detected to enable quick restoration.

Incidentally, in the case where the atmospheric pressure sensor 23 continuously outputs the atmospheric pressure BP indicated by a solid line from the ninth operation on the fourth day onward in FIG. 2, the process proceeds from the Step s6 to the Step s7 as a result of the determination in the Step s6 that the variation ΔBP as the difference between the minimum atmospheric pressure BPMIN and the maximum atmospheric pressure BPMAX is greater than the predetermined value Δbp. In the Step s7, the present number of operations Dn is cleared (indicated by "c"), and the process returns to the main routine.

As described above, the failure diagnostic system for the atmospheric pressure detecting device according to the present embodiment is capable of accurately detecting the stuck state and deterioration of the atmospheric pressure sensor 23 by the simple control logic as shown in FIGS. 5 to 7 without using any other special sensors, and making it possible to quickly take measures to restore the atmospheric pressure sensor 23.

If the number of operations Dn is only one, it is impossible to correctly determine whether the atmospheric pressure sensor 23 has failed or not. The failure diagnostic system according to the present embodiment, however, is capable of rationally determining whether the atmospheric pressure detecting device has failed or not without errors under any operational circumstances because the failure diagnosis conditions are not satisfied until the number of operations Dn exceeds the predetermined number of operations Dα. This eliminates such problems as deterioration of the operability and the exhaust gas, occurrence of engine knock, or the like caused by air-to-fuel ratio correction, ignition timing correction, or the like based on the determination that the vehicle is running on highlands regardless of the fact that the atmospheric pressure detecting device has failed.

The failure diagnostic system for the atmospheric pressure detecting device according to the present embodiment shown in FIG. 1 carries out failure diagnosis in the Step s4 when the atmospheric pressure BP is equal to or less than the high-altitude atmospheric pressure BPα, but does not determine whether an output from the atmospheric pressure sensor 23 is stuck or not while the atmospheric pressure BP is greater than the high-altitude atmospheric pressure BPα. Thus, a signal indicative of a failure in the atmospheric pressure sensor 23 is not transmitted even if the atmospheric pressure sensor 23 has failed (stuck) while outputting the atmospheric pressure BP equivalent to the flatland atmospheric pressure greater than the high-altitude atmospheric pressure BPα. Therefore, it is possible to prevent needless enlargement of such an operational range that failure diagnosis by failure diagnostic monitors for sensors used for other control is prohibited due to a failure in the atmospheric pressure sensor before the atmospheric pressure sensor is restored.

Figure 3B:
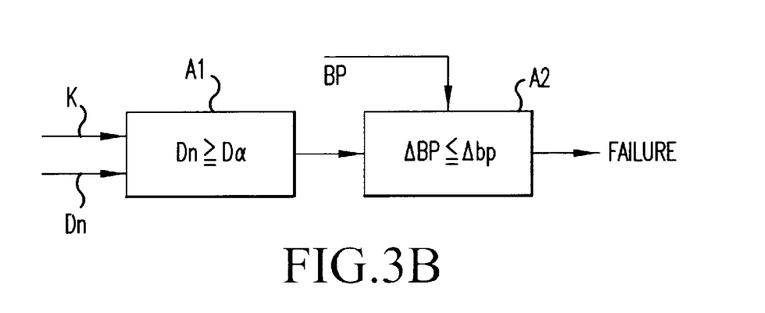

A description will now be given of a second embodiment of the present invention. In the present embodiment, the failure diagnostic system for the atmospheric pressure detecting device in FIG. 1 is replaced by a failure diagnostic system that executes a failure diagnosis routine in an overall atmospheric pressure range without executing the Step s4 of the above described failure diagnostic routine. According to the present embodiment, as shown in FIG. 3B, the engine controller 2 is comprised of the condition determination means A1 and the failure diagnosis section A2, which constitute a failure diagnostic function section for an atmospheric pressure detecting device. The failure diagnostic function section for the atmospheric pressure detecting device according to the second embodiment shown in FIG. 3(b) is different from the failure diagnostic system for the atmospheric pressure detecting device according to the first embodiment shown in FIG. 1 only in that the determination section A3 for determining whether or not the atmospheric pressure BP is equal to or less than the high-altitude atmospheric pressure BPα is not used. Otherwise, the control arrangements and control mechanisms of the failure diagnostic system according to the second embodiment are identical with those of the failure diagnostic system according to the first embodiment, and therefore, a description will now be given only of the difference.

A description will now be given of the control arrangement of the failure diagnostic system for the atmospheric pressure detecting device shown in FIG. 3B. The following description will be given with reference to FIG. 6 showing the initial check routine, FIG. 5 showing the failure diagnosis routine (the process proceeds from the Step s2 directly to the Step s5 without executing the Step s4 as indicated by a two-dot chain line in FIG. 5), and other figures.

Specifically, in the failure diagnosis routine, the process proceeds from the Step s2 directly to the Step s5 wherein the data calculation routine (refer to FIG. 7) is executed. The Steps b1 to b9 are executed as is the case with the failure diagnostic system for the atmospheric pressure detecting device according to the above described embodiment (FIG. 1). In particular, at a time point when the process reaches the Step b9, a difference between the maximum atmospheric pressure BPMAX and the minimum atmospheric pressure BPMIN in the third operation on the second day in FIG. 2 is calculated as a variation ΔBP (ΔBP=|BPMAX−BPMIN|), and if it is determined in the Step s6 that the variation ΔBP is greater than a predetermined value Δbp, the process proceeds to the Step s7. In the Step s7, the present failure diagnosis is cleared (indicated by "C"), i.e. the present number of operations Dn is cleared, and the process returns to the main routine.

The vehicle repeats running on flatlands seven times from the first to the third day. In the meantime, the failure diagnosis is cleared providing that the atmospheric pressure lowers on the second day even though the vehicle runs on the flatland, and the variation ΔBP exceeds the predetermined value Δbp.

Further, it is assumed that the atmospheric pressure sensor 23 does not operate and continuously outputs the atmospheric pressure BP as indicated by a two-dot chain line 12 from the fifth operation on the second day onward in FIG. 2. In this case, the variation ΔBP as the difference between the maximum atmospheric pressure BPMAX and the minimum atmospheric pressure BPMIN approximates to zero and is less than the predetermined value Δbp.

In this case, one warm-up cycle (W/U) in the fifth operation is finished, and the sixth operation is started upon the next start of the engine 1. If the process has reached the Step a3 of the initial check routine in the sixth operation, the maximum atmospheric pressure BPMAX, the minimum atmospheric pressure BPMIN, and the number of operations up to the present are read from the nonvolatile memory 203, and the process returns to the main routine. If the process has reached the Step b4 in the present value calculating process in the Step s4, the number of operations Dn is incremented by one only in the case where the warm-up progresses from the cold-start. In this way, the number of operations Dn is sequentially incremented one by one. For example, in the nineteenth operation on the ninth day in FIG. 2, if it is determined that the number of operations Dn of the engine 1 has reached the predetermined number of times Dα, the process proceeds from the Step s8 to the Step s9. Based on this determination, it can be assumed that the variation ΔBP in the atmospheric pressure BP detected by the atmospheric pressure sensor 23 in a period of time before the number of operations Dn exceeds the predetermined number of times Dα is less than the predetermined value Δbp and an output from the atmospheric pressure sensor 23 is stuck. A failure code is then set in the nonvolatile memory 203, and the alarm lamp, not shown, is turned on. The present control is then terminated, and the process then returns to the main routine.

As mentioned above, even in the case where the vehicle runs at the same altitude while running on highlands where the atmospheric pressure BP is less than the high-altitude atmospheric pressure BPα, it is assumed that there is the variation ΔBP of about the predetermined value Δbp in the atmospheric pressure BP the atmospheric pressure sensor 23 (in the present embodiment, a period of time in which the number of operations is estimated to reach the predetermined period of times Dα (15 times)). If there is no variation ΔBP of about the predetermined value Δbp, it can be rationally determined that the output from the atmospheric pressure sensor 23 has been stuck or the atmospheric pressure sensor 23 has deteriorated, thus making it possible to quickly take measures to restore the atmospheric pressure sensor 23.

Although in the above-described embodiments, the engine 1 is implemented by a multipoint injection engine that injects fuel from the fuel injection valve 34 to the intake manifold 16, the present invention may be applied to a cylinder injection engine while achieving the same effects.

As described above, the failure diagnostic system according to the present invention is capable of accurately detecting the stuck state or deterioration of the atmospheric pressure detecting device by simple control logic without using any special sensors such as an absolute pressure sensor, and making it possible to quickly take measures to restore the atmospheric pressure detecting device. Further, although it is impossible to correctly determine whether the atmospheric pressure detecting device has failed or not if the number of operations is only one, the failure diagnostic system according to the present invention is capable of rationally determining whether the atmospheric pressure detecting device has failed or not without errors under any operational circumstances because the failure diagnosis conditions are not satisfied until the number of operations exceeds the predetermined number of times. This eliminates such problems as deterioration of the operability and the exhaust gas, occurrence of engine knock, or the like caused by air-to-fuel ratio correction, ignition timing correction, or the like based upon the determination that the vehicle is running on highlands regardless of a failure in the atmospheric pressure detecting device.

Further, according to the present invention, when the temperature detecting device detects that the engine temperature has increased from the engine temperature at the start of the engine and the engine temperature has become higher than the predetermined warm-up completion temperature, it is determined that the engine has operated continuously for a predetermined period of time after the key-on start of the engine. Therefore, it is possible to determine whether the engine has continuously operated while excluding the short-time engine operation without using any other special sensors.

Further, if such control is provided that failure diagnosis is prohibited when the atmospheric pressure detecting device outputs an atmospheric pressure greater than the predetermined high-altitude atmospheric pressure, whether the atmospheric pressure detecting device has failed or not is determined only when the atmospheric pressure detecting device outputs an atmospheric pressure equal to or less than the predetermined high-altitude atmospheric pressure. Therefore, even if the atmospheric pressure detecting device fails while outputting a low-altitude atmospheric pressure greater than the high-altitude atmospheric pressure, a failure signal indicative of the failure in the atmospheric pressure detecting device is never transmitted. This prevents needless enlargement of such an operational range that failure diagnosis by failure diagnosis monitors for sensors used for other control is prohibited due to a failure in the atmospheric pressure detecting device.

Although in the above described embodiments, the present invention is applied to the failure diagnostic system for the atmospheric pressure detecting device used for the engine 1 of the vehicle, the present invention may be applied to any devices (e.g. power unit for a motor, compressor for an air-conditioning system and so on) to be operated insofar as the operating condition is controlled using an atmospheric pressure detected by an atmospheric pressure detecting device.

What is claimed is:

1. A failure diagnostic system for atmospheric pressure detecting device, which is provided in a device to be operated whose operating condition is controlled using an atmospheric pressure detected by the atmospheric pressure detecting device, and determines whether the atmospheric pressure detecting device has failed, the failure diagnostic system comprising:

a counter element that counts the number of operations of the device to be operated;

an atmospheric pressure storing element that stores information related to the detected atmospheric pressure; and a failure diagnosis element that determines that the atmospheric pressure detecting device has failed if the number of operations counted by said counter element reaches a predetermined number of times and a variation in the atmospheric pressure calculated based on the information related to the atmospheric pressure stored in said atmospheric pressure storing element before the number of operations reaches the predetermined number of times is equal to or less than a predetermined value.

2. A failure diagnostic system for atmospheric pressure detecting device according to claim 1, wherein said counter element is allowed to count the number of operations if said atmospheric pressure detecting device detects that the atmospheric pressure is equal to or less than a predetermined pressure.

3. A failure diagnostic system for atmospheric pressure detecting device according to claim 1, wherein said counter element detects a start of the device to be operated and counts the number of operations in response to the detection of the start.

4. A failure diagnostic system for atmospheric pressure detecting device according to claim 3, wherein the device to be operated is a power unit; and said counter element, after detecting the start of the power unit, counts the number of operations if determining that a temperature of the power unit has increased from a temperature detected at the start of the power unit by a predetermined value or greater.

5. A failure diagnostic system for atmospheric pressure detecting device according to claim 1, wherein said atmospheric pressure storing element stores a maximum value and a minimum value of the detected atmospheric pressure; and the variation in the detected atmospheric pressure is calculated based on the maximum value and the minimum value of the detected atmospheric pressure.

6. A failure diagnostic system for atmospheric pressure detecting device according to claim 1, further comprising:

a reset element that determines whether the variation in the detected atmospheric pressure has exceeded the predetermined value, and if determining that the variation in the detected atmospheric pressure has exceeded the predetermined value, resets the counted number of operations of the device to be operated, counted by said counter element.

7. A failure diagnostic system for atmospheric pressure detecting device according to claim 1, wherein the device to be operated is an engine, and said atmospheric pressure detecting device is disposed in an intake pipe of the engine.

8. A failure diagnosis method for atmospheric pressure detecting device, which is used for a device to be operated whose operating condition is controlled using an atmospheric pressure detected by the atmospheric pressure detecting device, and determines whether the atmospheric pressure detecting device has failed, the failure diagnosis method comprising:

a counting step of counting the number of operations of the device to be operated;

a storage step of storing information related to the detected atmospheric pressure; and a determination step of determining that the atmospheric pressure detecting device has failed, if the number of operations reaches a predetermined number of times, and a variation in the atmospheric pressure calculated based on the stored information related to the atmospheric pressure before the number of operations reaches the predetermined number of times is equal to or less than a predetermined value.

9. A failure diagnosis method for atmospheric pressure detecting device according to claim 8, wherein said counting step includes being allowed to count the number of operations if said atmospheric pressure detecting device detects that the atmospheric pressure is equal to or less than a predetermined pressure.

10. A failure diagnosis method for atmospheric pressure detecting device according to claim 8, wherein said counting step includes detecting a start of the device to be operated, and counting the number of operations in response to the detection of the start.

11. A failure diagnosis method for atmospheric pressure detecting device according to claim 10, wherein the device to be operated is a power unit; and said counting step includes, after detecting the start of the power unit, counting the number of operations if determining that a temperature of the power unit has increased from a temperature detected at the start of the power unit by a predetermined value or greater.

12. A failure diagnosis method for atmospheric pressure detecting device according to claim 8, wherein said storing step includes storing a maximum value and a minimum value of the detected atmospheric pressure; and the variation in the detected atmospheric pressure is calculated based on the maximum value and the minimum value of the detected atmospheric pressure.

13. A failure diagnosis method for atmospheric pressure detecting device according to claim 8, further comprising: a reset step of determining whether the variation in the detected atmospheric pressure has exceeded the predetermined value, and resetting the counted number of operations of the device to be operated, if determining that the variation in the detected atmospheric pressure has exceeded the predetermined value.

* * * * *